UNITED STATES PATENT OFFICE.

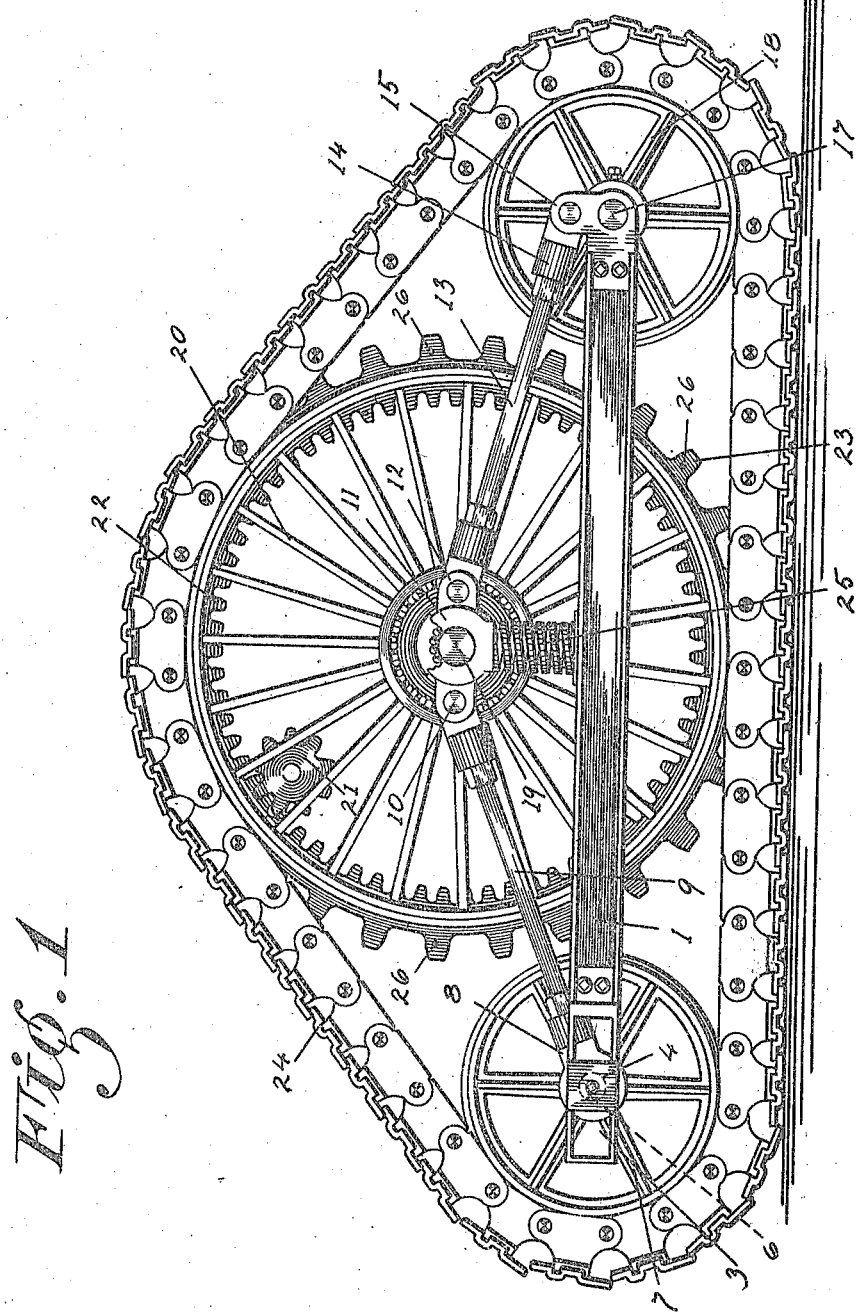

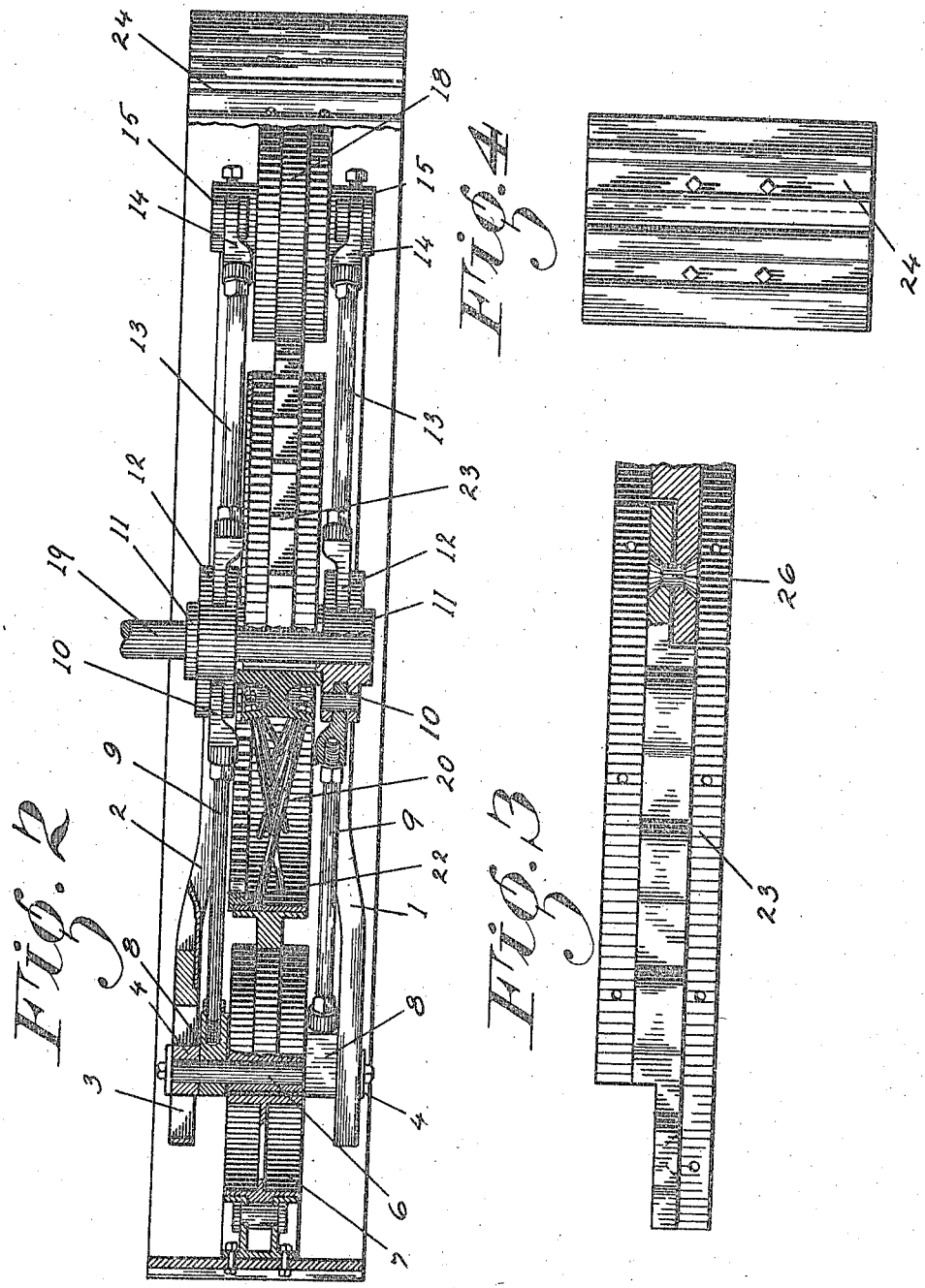

THOMAS R. PAULSEN, OF MODESTO, CALIFORNIA, ASSIGNOR OF ONE-FIFTH TO H. T. JOHNSON AND ONE-FIFTH TO SYLVAN LATZ.

PLATFORM-TRACK WHEEL.

1,255,218.

Specification of Letters Patent.

Patented Feb. 5, 1918.

Application filed May 7, 1917. Serial No. 166,817.

*To all whom it may concern:*

Be it known that I, THOMAS R. PAULSEN, a citizen of the United States, residing at Modesto, in the county of Stanislaus, State of California, have invented certain new and useful Improvements in Platform-Track Wheels; and I do declare the following to be a full, clear, and exact description of the same, reference being had to the accompanying drawings, and to the characters of reference marked thereon, which form a part of this application.

This invention relates to improvements in tractors and particularly to the traction wheels thereof. The object of the invention is to produce such a wheel as will embody the endless platform principle and at the same time be so flexible as to overcome the irregularities or obstructions in the ground surface without lifting the entire tractor as is now the common fault in most traction wheels of this type.

A further object of the invention is to produce a tractor wheel of the type noted wherein the driving power is disposed centrally of the platform wheel so that the driving gear of the wheel is centered upon the length of the endless platform and merely rolls over the same instead of having to drag the same as is now the common practice.

A still further object of the invention is to provide internal and external driving gears of the central wheel in segregated parts connected together so that when it is necessary to repair or replace the same this can be done cheaply and expeditiously without the necessity of disturbing the endless platform track.

A still further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side elevation of my complete wheel.

Fig. 2 is a plan view of the wheel partly broken out and in section.

Fig. 3 is a detached view showing how the driving gears are made in segments.

Fig. 4 is a plan view of one pair of connected sections of the endless platform.

Referring now more particularly to the characters of reference on the drawings I first provide a pair of spaced supporting beams 1 and 2, one end of each beam being provided with an elongated slot 3, slidable in which are boxes 4. Fixed to these journal boxes 4 is an axle 6 on which is turnable a rear platform supporting wheel 7.

Turnably mounted on the axle 6 between the beams 1 and 2 and the wheel 7 are collars 8, carrying rods 9 extending toward the center of the device and connected in hinged relation as at 10 with center holders 11. On the opposite sides of these holders 11 as at 12 are likewise hinged other rods 13 which in turn are hinged as at 14 to plates 15 secured at the forward ends of the supports 1 and 2.

In the forward ends of the supports 1 and 2 is mounted an axle 17 on which is turnable the forward platform supporting wheel 18.

Secured in the holders 11 is the central axle 19 on which is turnable the main driving wheel 20. The wheel 20 is arranged to be driven by power directed against a pinion 21 meshing with an internal pinion 22 on the wheel 20. On the outside of the wheel 20 is an external driving gear 23. The endless supporting platform 24 is mounted over the wheels 7 and 18 and over the gear 23. This gear 23 is so positioned and of such dimensions as to engage the lower side of the platform 24 as it lies horizontally on the ground surface but lifts the same considerably upward as it moves over the upper side of this gear 23.

The numeral 25 designates the tension springs interposed between the supporting members 1 and 2 and the holders 11. The action of these springs act on the beams 1 and 2 to force the wheels 7 and 18 downwardly against the endless platform 24 to maintain the proper traction thereof. When, however, such platform engages an unevenness or obstruction in the ground surface it can lift independently of the wheel 20 by means of the hinged connections of the rods 9 and 13 and with their respective wheels 7 and 18, the difference in the position being readily compensated for by the sliding boxes 4. When the center of the platform has passed the obstruction then the opposite end may be likewise readily lifted and move down the opposite side of the same, all of this being readily permitted of by reason of the entire wheel being mounted centrally between axles 6 and 17 upon the axle 19. The gears 22 and 23 are made of segments embodying each four, five or more teeth, such segments being bolted together as at 26 whereby when it becomes necessary to repair or replace the same this can be done easily without disturbing the balance of the structure.

From the foregoing description it will be apparent that I have provided an endless platform wheel centrally driven. The central driving wheel lays the platform horizontally upon the ground surface in an efficient manner and then rolls directly upon the same. This is a decided advantage over the type where the driving wheel is at one end of the platform. This latter construction make an unnecessary drag and excessive wear of the parts and likewise prevents the possibility of having a flexible wheel such as mine. By means of my central holder, the endless platform may be moved over obstructions of considerable height and still not tend to lift the forward end of the tractor in any degree. In the now commonly used type of tractors the moment the platform wheel strikes an obstruction it lifts the entire frame of the tractor; when the obstruction is surmounted then the entire tractor construction drops to the ground with a tremendous force. This is very hard on the mechanism and tends toward excessive wear of the parts.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A traction wheel comprising a center axle, an axle spaced from each side of the center axle and having hinged connection therewith, a driving wheel mounted on the center axle, supporting wheels carried by the outer axles, and an endless platform supported by the outer wheels and supporting and driven by the center wheel.

2. A traction wheel comprising rigid supporting beams, a fixed axle at one end, and a slidable axle at the opposite end, a spring supported axle disposed centrally above the beams, said last named axle being in hinged connection with the end axles, supporting wheels mounted on the outer axles, a driving wheel mounted in the center axle, and an endless platform supported by the end wheels and supporting and driven by the center wheel.

3. A traction wheel comprising supporting beams slotted at one end, an axle slidable in the slots, an axle fixed at the opposite ends of the beams, springs mounted centrally of the beams, an axle supported on the springs, rods hinged to the end axles and the center axle, supporting wheels carried on the outer axles, a driving wheel turnable on the center axle, and an endless platform supported by the outer wheels and supporting and driven by the center wheel.

In testimony whereof I affix my signature.

THOMAS R. PAULSEN.